United States Patent
Zhang et al.

(10) Patent No.: US 11,405,898 B2
(45) Date of Patent: Aug. 2, 2022

(54) SYSTEM AND METHOD FOR ALLOCATING RESOURCE BLOCKS

(71) Applicant: ZTE CORPORATION, Guangdong (CN)

(72) Inventors: Chenchen Zhang, Guangdong (CN); Peng Hao, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 98 days.

(21) Appl. No.: 16/293,511

(22) Filed: Mar. 5, 2019

(65) Prior Publication Data
US 2019/0200345 A1 Jun. 27, 2019

Related U.S. Application Data

(63) Continuation of application No. PCT/CN2017/088608, filed on Jun. 16, 2017.

(51) Int. Cl.
*H04W 72/04* (2009.01)
*H04L 5/00* (2006.01)
*H04W 72/12* (2009.01)

(52) U.S. Cl.
CPC ....... *H04W 72/0413* (2013.01); *H04L 5/0044* (2013.01); *H04L 5/0053* (2013.01);
(Continued)

(58) Field of Classification Search
None
See application file for complete search history.

(56) References Cited

U.S. PATENT DOCUMENTS

2012/0044889 A1* 2/2012 Jen .................... H04L 1/1854
370/329
2013/0242890 A1* 9/2013 He ..................... H04L 1/189
370/329
(Continued)

FOREIGN PATENT DOCUMENTS

CN 101789823 A 7/2010
WO 2011/011636 A2 1/2011

OTHER PUBLICATIONS

International Search Report dated Feb. 28, 2018, in corresponding International Application No. PCT/CN2017/088608.
(Continued)

*Primary Examiner* — Steve R Young
(74) *Attorney, Agent, or Firm* — Duane Morris LLP

(57) ABSTRACT

A system and method for allocating network resources are disclosed herein. In one embodiment, the system and method are configured to perform: transmitting a first control signal using at least a first one of one or more communication resources via a first communication channel, wherein the first control signal indicates which of the one or more communication resources can be used for transmitting data via a second communication channel; and responsive to the first control signal indicating that the at least first one of the one or more communication resources can be used for transmitting data via the second communication channel, transmitting the data using at least part of the at least first one of the one or more communication resources via the second communication channel.

20 Claims, 7 Drawing Sheets

(52) U.S. Cl.
CPC ......... *H04L 5/0094* (2013.01); *H04W 72/048* (2013.01); *H04W 72/1289* (2013.01); *H04W 72/1284* (2013.01)

(56) References Cited

U.S. PATENT DOCUMENTS

| | | |
|---|---|---|
| 2014/0153452 A1 | 6/2014 | Son et al. |
| 2014/0355550 A1 | 12/2014 | Yano et al. |
| 2017/0257864 A1* | 9/2017 | Kakishima ............... H04J 1/00 |
| 2018/0049176 A1* | 2/2018 | Park ...................... H04L 5/0053 |
| 2018/0368116 A1* | 12/2018 | Liao ...................... H04W 76/27 |
| 2019/0007959 A1* | 1/2019 | Hwang ............. H04W 72/0446 |
| 2019/0215810 A1* | 7/2019 | Mu ....................... H04L 1/1812 |
| 2020/0021419 A1* | 1/2020 | Taherzadeh Boroujeni ................ H04L 5/0053 |
| 2020/0205142 A1* | 6/2020 | Gao ...................... H04L 5/0048 |

OTHER PUBLICATIONS

Extended European Search Report dated Nov. 18, 2019, in corresponding European Application No. 17913652.8.
ZTE, ZTE Microelectronics "Resource sharing between PDCCH and PDSCH," R1-1704371, 3GPP TSG RAN WG1 Meeting 88bis, Spokane, Apr. 3-7, 2017, 5 pages.
ZTE "Resource sharing between PDCCH and PDSCH," R1-1707163, 3GPP TSG RAN WG1 Meeting #89, Hangzhou, China, May 19, 2017, 9 pages.
Nokia, Alcatel-Lucent Shanghai Bell "Resource sharing between PDCCH and PDSCH in NR," R1-1708504, 3GPP TSG RAN WG1 Meeting #89, Hangzhou, China, May 19, 2017, 7 pages.
Samsung "Multiplexing NR-PDCCH and PDSCH" 3GPP TSG RAN WG1 Nr Ad-Hoc#2, R1-1710696 Qingdao, P.R. China, Jun. 27-30, 2017, 6 pages.
ZTE "Considerations on using a puncturing indicator in dynamic DL resource sharing between URLLC & eMBB" 3GPP TSG RAN WG1 Meeting #88b, R1-1704780, Spokane, USA, Apr. 3-7, 2017, 5 pages.

* cited by examiner

SYSTEM AND METHOD FOR ALLOCATING RESOURCE BLOCKS

RELATED APPLICATION

The present application is a continuation based on PCT Application No. PCT/CN2017/088608 filed on Jun. 16, 2017 and entitled "System and Method for Allocating Resource Blocks," the contents of which are incorporated by reference herein in its entirety.

TECHNICAL FIELD

The disclosure relates generally to wireless communications and, more particularly, to systems and methods for allocating resource blocks.

BACKGROUND

In wireless communications, when a base station (BS) is preparing to transmit data to a user equipment device (UE), a scheduling process is typically performed before the BS actually receives the data from the UE. Such a scheduling process typically provides some control information (e.g., downlink control information (DCI)) that is transmitted through one or more physical channels (e.g., a physical downlink control channel (PDCCH)) to the UE. In particular, the control information comprises various specified parameters that the UE may use for receiving and transmitting the data such as, for example, downlink (i.e., from the BS to the UE) scheduling commands, uplink (i.e., from the UE to the BS) scheduling grants, uplink power control commands, etc.

In the Long Term Evolution (LTE) network, the legacy PDCCH is pre-coded with transmit diversity on 1/2/4 cell-specific reference signal (CRS) antenna ports, and cross-interleaved with other PDCCHs, such that the legacy PDCCH is distributed over an entire system bandwidth in a control region within a subframe. Further, resources (e.g., resource blocks) allocated in the legacy PDCCH, used to transmit the above-mentioned DCI, cannot be used in other channels that are used to transmit data (e.g., a physical downlink shared channel (PDSCH)). Alternatively stated, the resource blocks in the legacy PDCCH consumes the entire system bandwidth, and even though remaining resource blocks in the legacy PDCCH are present, such remaining resource blocks cannot be used for transmitting data on other channels.

Such an inflexible use on the resource blocks in the legacy PDCCH may disadvantageously waste valuable resource blocks. Therefore, existing techniques for allocating resource blocks in the legacy PDCCH are not entirely satisfactory.

SUMMARY OF THE INVENTION

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the invention.

In one embodiment, a method includes: transmitting a first control signal using at least a first one of one or more communication resources via a first communication channel, wherein the first control signal indicates which of the one or more communication resources can be used for transmitting data via a second communication channel; and responsive to the first control signal indicating that the at least first one of the one or more communication resources can be used for transmitting data via the second communication channel, transmitting the data using at least part of the at least first one of the one or more communication resources via the second communication channel.

In a further embodiment, a method includes: receiving a first control signal transmitted using at least a first one of one or more communication resources via a first communication channel, wherein the first control signal indicates which of the one or more communication resources can be used for transmitting data via a second communication channel; and receiving the data transmitted using at least part of the at least first one of the one or more communication resources via the second communication channel in response to the first control signal indicating that the at least first one of the one or more communication resources can be used for transmitting data via the second communication channel.

In another embodiment, a communication node includes: a transmitter configured to transmit a first control signal using at least a first one of one or more communication resources via a first communication channel, wherein the first control signal indicates which of the one or more communication resources can be used for transmitting data via a second communication channel, and in response to the first control signal indicating that the at least first one of the one or more communication resources can be used for transmitting data via the second communication channel, further configured to transmit the data using at least part of the at least first one of the one or more communication resources via the second communication channel.

In yet another embodiment, a communication node, includes: a receiver configured to receive a first control signal transmitted using at least a first one of one or more communication resources via a first communication channel, wherein the first control signal indicates which of the one or more communication resources can be used for transmitting data via a second communication channel, and receive the data transmitted using at least part of the at least first one of the one or more communication resources via the second communication channel in response to the first control signal indicating that the at least first one of the one or more communication resources can be used for transmitting data via the second communication channel.

BRIEF DESCRIPTION OF THE DRAWINGS

Various exemplary embodiments of the invention are described in detail below with reference to the following Figures. The drawings are provided for purposes of illustration only and merely depict exemplary embodiments of the invention to facilitate the reader's understanding of the invention. Therefore, the drawings should not be considered limiting of the breadth, scope, or applicability of the invention. It should be noted that for clarity and ease of illustration these drawings are not necessarily drawn to scale.

DETAILED DESCRIPTION OF EXEMPLARY EMBODIMENTS

Various exemplary embodiments of the invention are described below with reference to the accompanying figures to enable a person of ordinary skill in the art to make and use the invention. As would be apparent to those of ordinary skill in the art, after reading the present disclosure, various changes or modifications to the examples described herein can be made without departing from the scope of the invention. Thus, the present invention is not limited to the exemplary embodiments and applications described and illustrated herein. Additionally, the specific order or hierarchy of steps in the methods disclosed herein are merely exemplary approaches. Based upon design preferences, the specific order or hierarchy of steps of the disclosed methods or processes can be re-arranged while remaining within the scope of the present invention. Thus, those of ordinary skill in the art will understand that the methods and techniques disclosed herein present various steps or acts in a sample order, and the invention is not limited to the specific order or hierarchy presented unless expressly stated otherwise.

Figure 1:
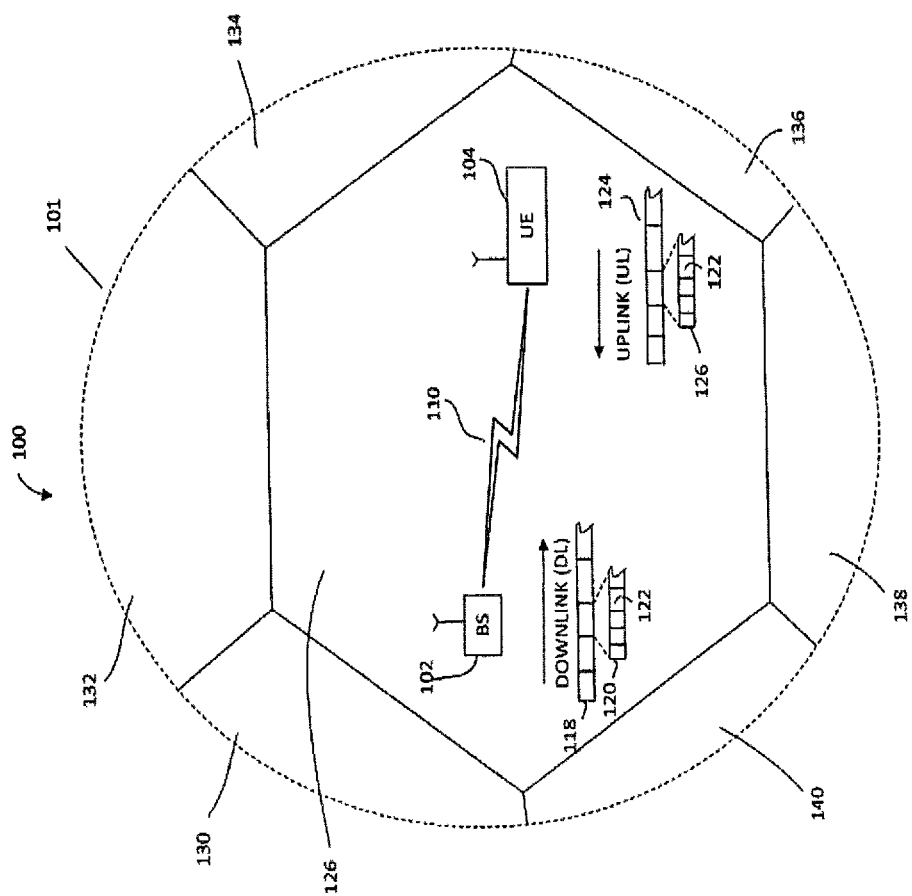
FIG. 1 illustrates an exemplary cellular communication network in which techniques disclosed herein may be implemented, in accordance with an embodiment of the present disclosure.

FIG. 1 illustrates an exemplary wireless communication network 100 in which techniques disclosed herein may be implemented, in accordance with an embodiment of the present disclosure. The exemplary communication network 100 includes a base station 102 (hereinafter "BS 102") and a user equipment device 104 (hereinafter "UE 104") that can communicate with each other via a communication link 110 (e.g., a wireless communication channel), and a cluster of notional cells 126, 130, 132, 134, 136, 138 and 140 overlaying a geographical area 101. In FIG. 1, the BS 102 and UE 104 are contained within the geographic boundary of cell 126. Each of the other cells 130, 132, 134, 136, 138 and 140 may include at least one base station operating at its allocated bandwidth to provide adequate radio coverage to its intended users. For example, the base station 102 may operate at an allocated channel transmission bandwidth to provide adequate coverage to the UE 104. The base station 102 and the UE 104 may communicate via a downlink radio frame 118, and an uplink radio frame 124 respectively. Each radio frame 118/124 may be further divided into sub-frames 120/126 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the invention.

Figure 2:
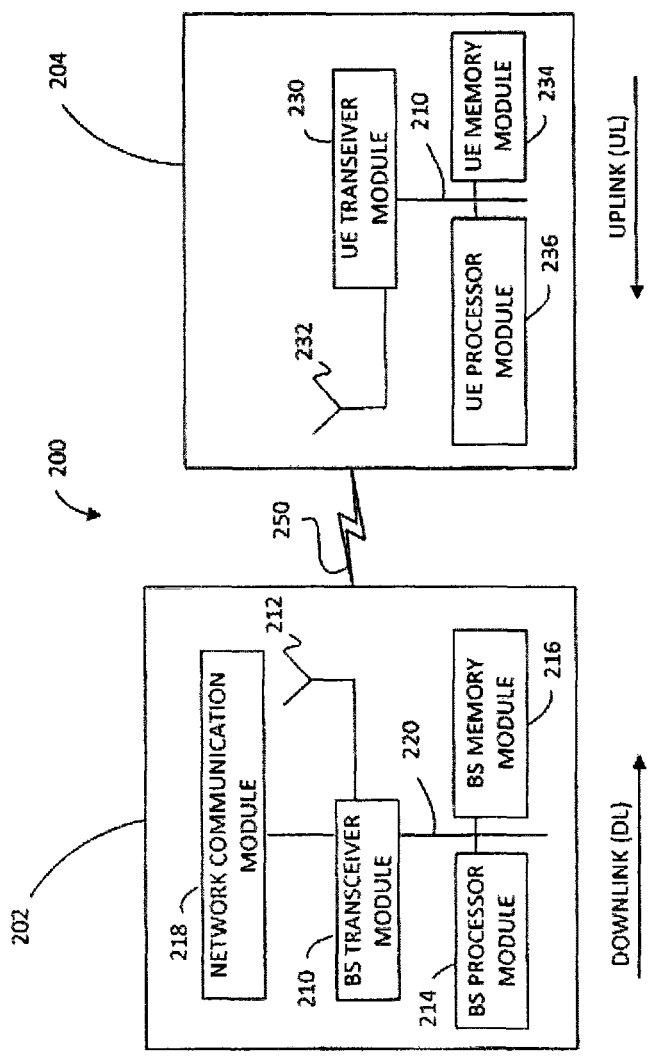
FIG. 2 illustrates block diagrams of an exemplary base station and a user equipment device, in accordance with some embodiments of the present disclosure.

FIG. 2 illustrates a block diagram of an exemplary wireless communication system 200 for transmitting and receiving wireless communication signals, e.g., OFDM/OFDMA signals, in accordance with some embodiments of the invention. The system 200 may include components and elements configured to support known or conventional operating features that need not be described in detail herein. In one exemplary embodiment, system 200 can be used to transmit and receive data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a date communication bus 220. The UE 204 includes a UE (user equipment) transceiver module 230, a UE antenna 232, a UE memory module 234, and a UE processor module 236, each module being coupled and interconnected with one another as necessary via a date communication bus 240. The BS 202 communicates with the UE 204 via a communication channel 250, which can be any wireless channel or other medium known in the art suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as limiting the scope of the present invention.

In accordance with some embodiments, the UE transceiver 230 may be referred to herein as an "uplink" transceiver 230 that includes a RF transmitter and receiver circuitry that are each coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes RF transmitter and receiver circuitry that are each coupled to the antenna 212. A downlink duplex switch may alternatively couple the downlink transmitter or receiver to the downlink antenna 212 in time duplex fashion. The operations of the two transceivers 210 and 230 are coordinated in time such that the uplink receiver is coupled to the uplink antenna 232 for reception of transmissions over the wireless transmission link 250 at the same time that the downlink transmitter is coupled to the downlink antenna 212. Preferably there is close time synchronization with only a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some exemplary embodiments, the UE transceiver 210 and the base station transceiver 210 are configured to support industry standards such as the Long Term Evolution (LTE) and emerging 5G standards, and the like. It is understood, however, that the invention is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)).

Referring again to FIG. 1, as discussed above, when the BS 102 is preparing to transmit data to the UE 104, a scheduling process is typically performed before the BS actually transmits and receives the data from the UE 104. During such a scheduling process, control information such as, for example, DCI is typically transmitted from the BS 102 to the UE 104 via one or more physical channels, e.g., a PDCCH.

In some embodiments, the BS 102 may use one or more control resource sets (hereinafter "CORESETs") to transmit the DCI via the PDCCH. In particular, such a CORESET is a subset of resource blocks within which the UE 104 attempts to blindly decode the DCI so as to retrieve information contained in the DCI. In other words, one CORESET is a subset of resource blocks selected from respective resource blocks occupied by the PDCCH. According to some embodiments of the present disclosure, the "resource block" as used herein is referred to as a resource unit that spans across respective time range (e.g., symbols) and frequency range (e.g., sub-carrier channels). As such, each CORESET as discussed herein may span across respective time and frequency ranges. In accordance with some embodiments, when the BS 102 uses such one or more CORESETs to transmit the DCI, the BS 102 may include a filed in the DCI to indicate which of the one or more CORESETs can be used by other channels (e.g., a PDSCH) for the BS 102 to transmit data. In a further embodiment, the BS 102 may transmit another DCI indicating that in the CORESET that can be used to transmit data, which of respective resource blocks can be used to transmit the data.

Figure 3:
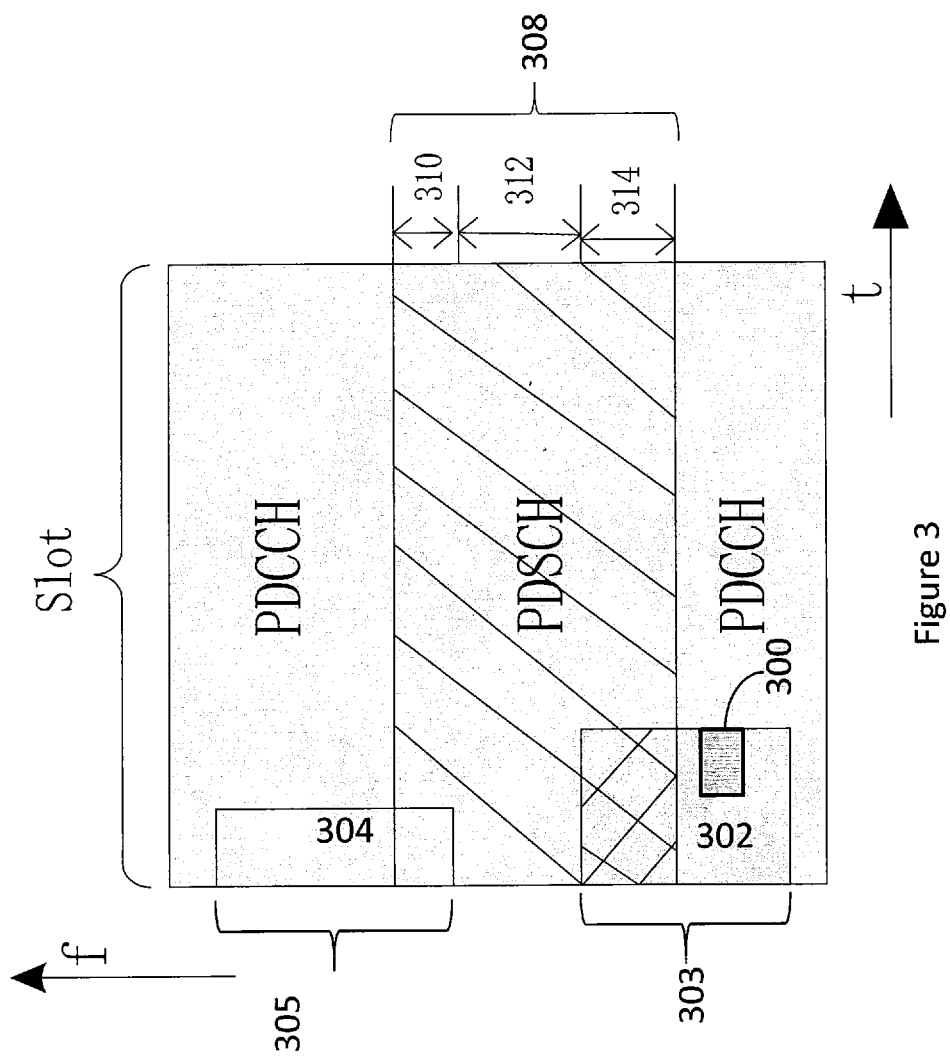
FIG. 3 illustrates a scenario where a downlink control information (DCI) signal indicates that one of two control resource sets (CORESETs) can be used to transmit data, in accordance with some embodiments of the present disclosure.

FIG. 3 illustrates a scenario where a signal carrying the DCI 300 (hereinafter "DCI signal 300") indicates that one of two exemplary CORESETs 302 and 304 can be used to transmit data. In some embodiments, a BS may assign two CORESETs 302 and 304 on the PDCCH to a UE. Each of the CORESETs 302 and 304 may be distributed across a respective time-frequency area (i.e., spanning across a respective resource blocks). In the illustrated embodiment of FIG. 3, the CORESET 302 may extend across two symbols (e.g., OFDM symbols) along a time domain (i.e., "t" in FIG. 3) and extend across a frequency range 303 along a frequency domain ("i.e., "f" in FIG. 3); and the CORESET 304 may extend across one symbol (e.g., an OFDM symbol) along the time domain and extend across a frequency range 305 along the frequency domain. As known by persons of ordinary skill in the art, the symbol may be a unit of a resource block in the time domain. Thus, it is noted that such symbols along the time domain are not shown for clarity of illustration. In some embodiments, such configurations of the CORESETs 302 and 304 may be predefined by a protocol of a network, in which the BS and UE are located, for example, a radio resource control (RRC) protocol.

In some embodiments, the BS may use the CORESET 302 to transmit the DCI signal 300 to the UE. As mentioned above, the DCI signal 300 may include various information such as, for example, respective resource blocks, which includes respective time and frequency ranges, to be used by the PDSCH. In FIG. 3, the PDSCH extends across 1 time slot along the time domain and across a frequency range 308 along the frequency domain. Moreover, in some embodiments, the DCI signal 300 may include a field to indicate which of the CORESETs 302 and 304 can be used by the PDSCH (i.e., which of respective resource blocks of the CORESETs 302 and 304 can be used to transmit data on the PDSCH) based on the resource block configurations of the CORESETs 302 and 304, which may be predefined as mentioned above, and respective "overlapped" relations with the PDSCH in terms of the resource blocks.

For example, in FIG. 3, the CORESET 302 overlaps the PDSCH by resource blocks extending across a frequency range 314 and across the same time duration of the CORE-SET 302 (2 symbols in the current example), and the CORESET 304 overlaps the PDSCH by resource blocks extending across a frequency range 310 and across the same time duration of the CORESET 304 (1 symbol in the current example). Based on such resource blocks configurations and respective usages of the CORESETs 302 and 304, the BS may determine that only CORESET 302 can be used by the PDSCH. In some embodiments, a field within the DCI signal 300 may indicate that the resource blocks overlapped by the CORESET 302 and the PDSCH can be used by the BS to transmit data on the PDSCH, and the resource blocks overlapped by the CORESET 304 and the PDSCH cannot be used by the BS to transmit data on the PDSCH.

In some embodiments, such a field in the DCI may be implemented by various techniques such as, for example, a bitmap. In the example of FIG. 3, a bitmap with a length of 2 bits may be used, which is determined based on a number of CORESETs in accordance with some embodiments. When only the CORESET 302 is chosen to be used by the PDSCH, the bitmap may indicate a value of "01;" and when only the CORESET 304 is chosen to be used by the PDSCH, the bitmap may indicate a value of "10," for example. More specifically, when the bitmap indicates 01, the resource blocks overlapped by the CORESET 302 and the PDSCH can be used by the BS to transmit data on the PDSCH; and when the bitmap indicates 10, the resource blocks overlapped by the CORESET 304 and the PDSCH can be used by the BS to transmit data on the PDSCH.

Figure 4:
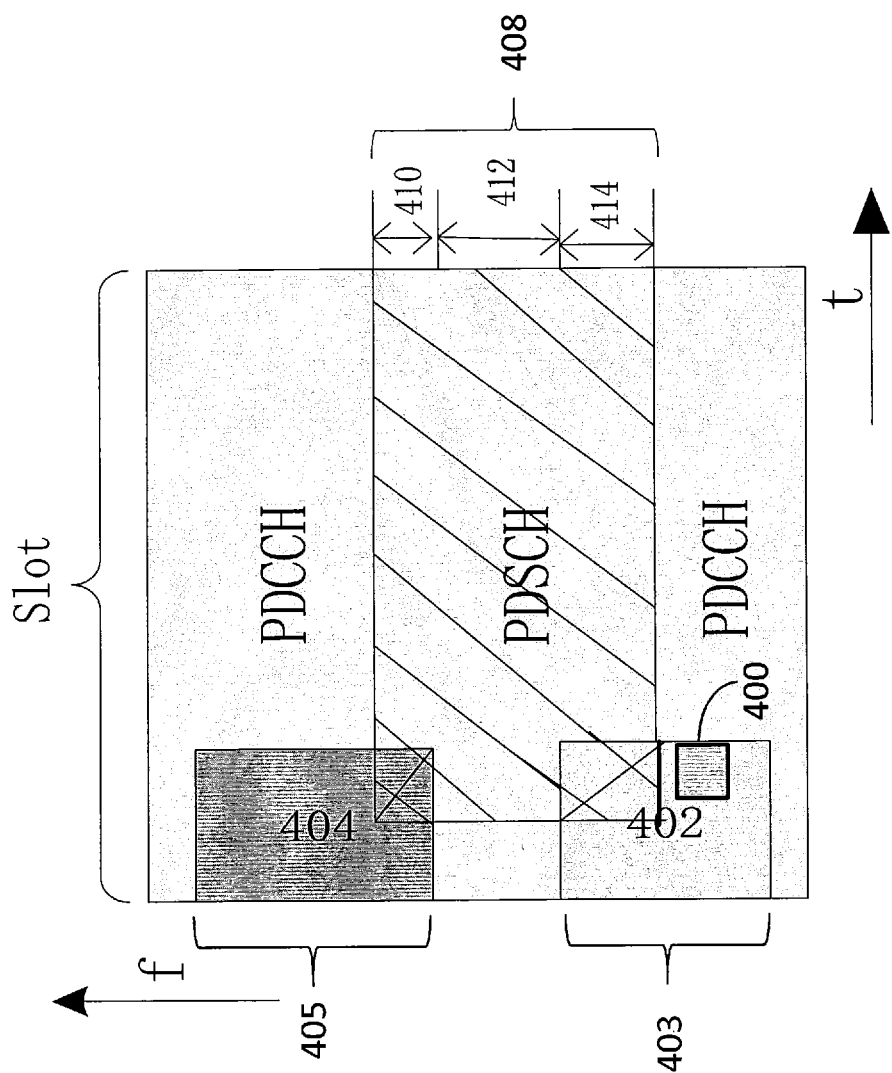
FIG. 4 illustrates a scenario where a downlink control information (DCI) signal indicates that both of two control resource sets (CORESETs) can be used to transmit data, in accordance with some embodiments of the present disclosure.

FIG. 4 illustrates a scenario where a signal carrying DCI 400 (hereinafter "DCI signal 400") indicates that both of two exemplary CORESETs 402 and 404 can be used to transmit data. In some embodiments, a BS may assign two CORE-SETs 402 and 404 on the PDCCH to a UE. Each of the CORESETs 402 and 404 may be distributed across a respective time-frequency area (i.e., spanning across respective resource blocks). In the illustrated embodiment of FIG. 4, the CORESET 402 may extend across two symbols (e.g., OFDM symbols) along a time domain (i.e., "t" in FIG. 4) and extend across a frequency range 403 along a frequency domain ("i.e., "f" in FIG. 4); and the CORESET 404 may also extend across two symbols (e.g., OFDM symbols) along the time domain and extend across a respective frequency range 405 along the frequency domain.

In FIG. 4, a PDSCH, assigned by the DCI signal 400, extends across 1 time slot except for a first symbol along the time domain and across a frequency range 408 along the frequency domain. Similarly, in some embodiments, the DCI signal 400 may include a field to indicate which of the CORESETs 402 and 404 can be used by the PDSCH based on the resource block configurations of the CORESETs 402 and 404, which may be predefined as mentioned above, and respective "overlapped" relations with the PDSCH in terms of the resource blocks.

For example, in FIG. 4, the CORESET 402 overlaps the PDSCH by resource blocks extending across a frequency range 414 and across a time duration (e.g., 1 symbol in the current example), and the CORESET 404 overlaps the PDSCH by resource blocks extending across a frequency range 410 and across the same time duration (e.g., 1 symbol in the current example). Based on such resource blocks configurations and respective usages of the CORESETs 402 and 404, the BS may determine that both CORESETs 402 and 404 can be used by the PDSCH. In other words, the field of the DCI signal 400 may indicate that the resource blocks overlapped by the CORESET 402 and the PDSCH, which includes resource blocks across the frequency range 410 and 1 symbol, can be used by the BS to transmit data on the PDSCH, and, in addition, the resource blocks overlapped by the CORESET 404 and the PDSCH, which includes resource blocks across the frequency range 414 and 1 symbol, can be used by the BS to transmit data on the PDSCH. Similarly, the field of the DCI signal 400 can be implemented by the bitmap described with respect to FIG. 3. In the example of FIG. 4, the bitmap may be present as "11."

Figure 5:
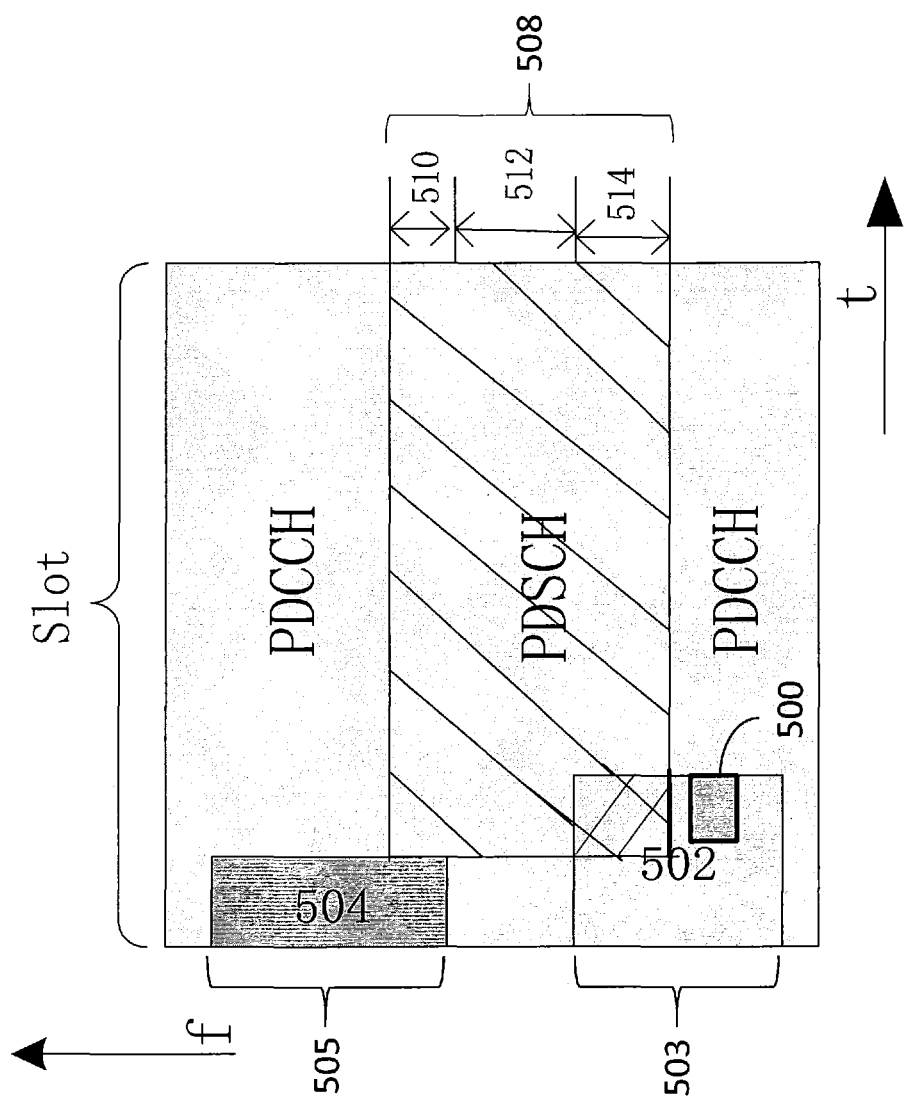
FIG. 5 illustrates another scenario where a downlink control information (DCI) signal indicates that one of two control resource sets (CORESETs) can be used to transmit data, in accordance with some embodiments of the present disclosure.

FIG. 5 illustrates a scenario where a signal carrying DCI 500 (hereafter "DCI signal 500") indicates that one of two exemplary CORESETs 502 and 504 can be used to transmit data. In some embodiments, a BS may assign two CORE-SETs 502 and 504 on the PDCCH to a UE. Each of the CORESETs 502 and 504 may be distributed across a respective time-frequency area spanning across respective resource blocks. In the illustrated embodiment of FIG. 5, the CORESET 502 may extend across two symbols (e.g., OFDM symbols) along a time domain (i.e., "t" in FIG. 5) and extend across a frequency range 503 along a frequency domain ("i.e., "f" in FIG. 5); and the CORESET 504 may extend across one symbol (e.g., one OFDM symbol) along the time domain and extend across a respective frequency range 505 along the frequency domain.

In FIG. 5, a PDSCH, assigned by the DCI signal 500, extends across 1 time slot except for a first symbol along the time domain and across a frequency range 508 along the frequency domain. Similarly, in some embodiments, the DCI signal 500 may include a field to indicate which of the CORESETs 502 and 504 can be used by the PDSCH based on the resource block configurations of the CORESETs 502 and 504, which may be predefined as mentioned above, and respective "overlapped" relations with the PDSCH in terms of the resource blocks.

For example, in FIG. 5, the CORESET 502 overlaps the PDSCH by resource blocks extending across a frequency range 514 and across a time duration (e.g., 1 symbol in the current example), and the CORESET 504 overlaps the PDSCH by resource blocks extending across a frequency range 510 and with no time duration (i.e., no overlap along the time domain). Based on such resource blocks configurations and respective usages of the CORESETs 502 and 504, the BS may determine that only CORESET 502 can be used by the PDSCH. In other words, the field of the DCI signal 500 may indicate that the resource blocks overlapped by the CORESET 502 and the PDSCH can be used by the BS to transmit data on the PDSCH. Similarly, the field of the DCI signal 500 can be implemented by the bitmap described with respect to FIGS. 3 and 4. In the example of FIG. 5, the bitmap may indicate a value of "01," which can indicate that the resource blocks overlapped by the CORESET 502 and the PDSCH can be used by the BS to transmit data on the PDSCH, in accordance with some embodiments. In some alternative embodiments, since the resource block configurations of the CORESETs 502 and 504 are predefined, the BS may be aware that no overlap between the CORESET 504 and the PDSCH exists. Accordingly, the field of the DCI signal 500 may be implemented by a different bitmap, which includes one bit for indicating that CORESET 502 can be used by the BS to transmit data on the PDSCH, in accordance with some embodiments.

Figure 6:
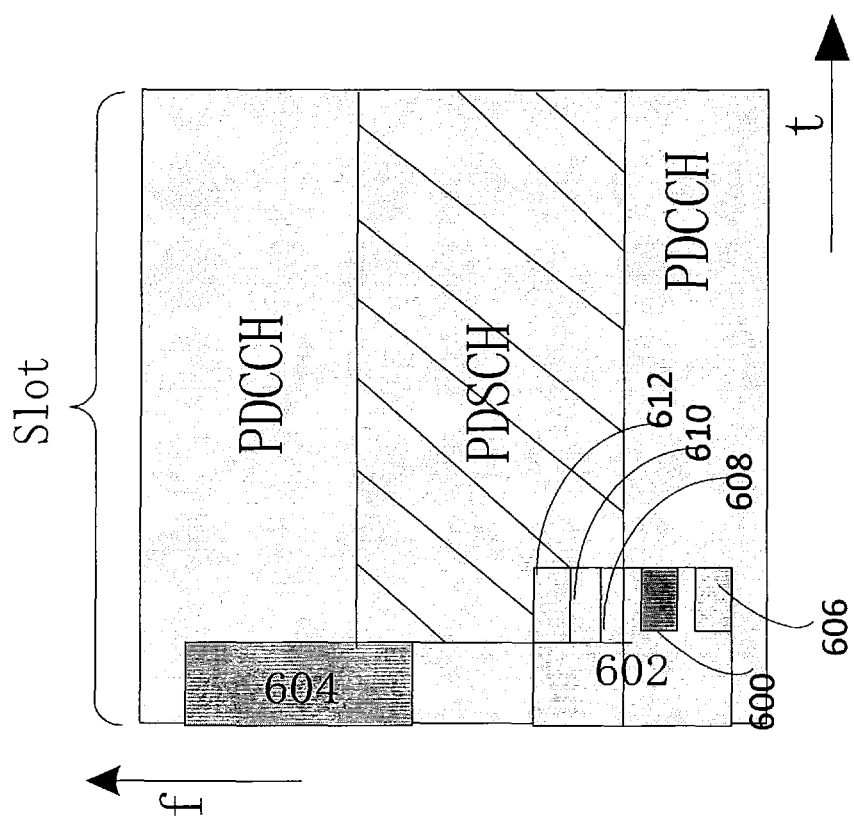
FIG. 6 illustrates another scenario where a first downlink control information (DCI) signal indicates that one of two control resource sets (CORESETs) can be used to transmit data and a second DCI signal indicates which resource blocks in the indicated CORESET can be used to transmit data, in accordance with some embodiments of the present disclosure.

FIG. 6 illustrates a scenario where a first signal carrying a first DCI 600 (hereinafter "DCI signal 600") indicates that one of two exemplary CORESETs 602 and 604 can be used to transmit data, and a second signal carrying a second DCI 606 (hereinafter "DCI signal 606") further indicates which resource block in the CORESET 602 that overlap with the PDSCH can be used by the PDSCH to transmit the data. The resource block configurations of the CORESETs 602 and 604, and PDSCH in FIG. 6 are substantially similar to the CORESETs 502 and 504 of FIG. 5 such that discussions of the resource blocks of the CORESETs 602 and 604 that overlap with the PDSCH in the time and frequency domains are not repeated here. The first DCI signal 600, which may be substantially similar to the DCI signal 500 of FIG. 5, uses its respective field to indicate that only CORESET 602 can be used by the PDSCH. In some embodiments, the BS may send the second DCI signal 606 to further indicate which resource block(s) in the CORESET 602 that overlap with the PDSCH can be used by the PDSCH. For example, as shown in FIG. 6, the resource blocks overlapped by the PDSCH and the CORESET 602 includes three resource blocks 608, 610, and 612, each of which extends across a respective frequency range. Accordingly, the second DCI signal 602 may use another field to indicate which of the resource blocks 608, 610, and 612 can be used by the PDSCH. In some embodiments, such a second DCI signal 602 can be sent via either the PDCCH, as shown in FIG. 6, or the PDSCH (not shown).

Figure 7:
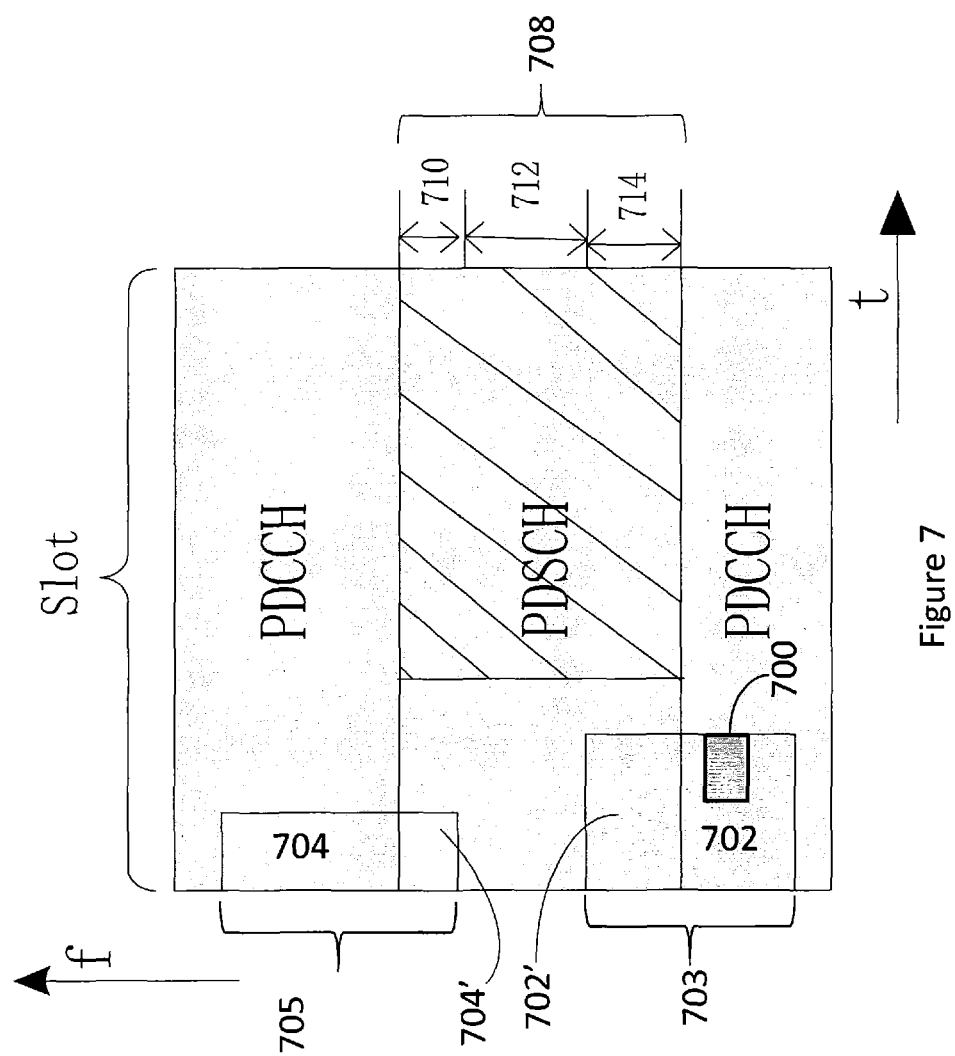
FIG. 7 illustrates yet another scenario where a downlink control information (DCI) signal indicates that at least one of two control resource sets (CORESETs) can be used to transmit data, in accordance with some embodiments of the present disclosure.

FIG. 7 illustrates a scenario where a signal carrying DCI 700 (hereinafter "DCI signal 700") indicates that at least one of two exemplary CORESETs 702 and 704 can be used to transmit data. In some embodiments, a BS may assign two CORESETs 702 and 704 on the PDCCH to a UE. Each of the CORESETs 702 and 704 may be distributed across a respective time-frequency area (i.e., spanning across a respective resource blocks). In the illustrated embodiment of FIG. 7, the CORESET 702 may extend across two symbols (e.g., OFDM symbols) along a time domain (i.e., "t" in FIG. 7) and extend across a frequency range 703 along a frequency domain ("i.e., "f" in FIG. 7); and the CORESET 704 may extend across one symbol (e.g., an OFDM symbol) along the time domain and extend across a frequency range 705 along the frequency domain. In some embodiments, such configurations of the CORESETs 702 and 704 may be predefined by a protocol of a network, in which the BS and UE are located, for example, a radio resource control (RRC) protocol.

In some embodiments, the BS may use the CORESET 702 to transmit the DCI signal 700 to the UE. As mentioned above, the DCI signal 700 may include various information such as, for example, respective resource blocks, which includes respective time and frequency ranges, to be used by the PDSCH. In FIG. 7, the PDSCH extends along the time domain starting at a fourth symbol (i.e., the PDSCH is spaced from the CORESET 702 by one symbol along the time domain), and across a frequency range 708 along the frequency domain. Moreover, in some embodiments, the DCI signal 700 may include a field to indicate which of the CORESETs 702 and 704 can be used by the PDSCH (i.e., which of respective resource blocks of the CORESETs 702 and 704 can be used to transmit data on the PDSCH) based on the resource block configurations of the CORESETs 702 and 704, which may be predefined as mentioned above, and respective "overlapped" relations with the PDSCH in terms of the resource blocks along the frequency domain.

For example, in FIG. 7, although neither the CORESETs 702 nor 704 overlaps the PDSCH, the CORESET 702 includes a portion of resource blocks that extend into the frequency range 708 of the PDSCH by a frequency range 714 along the frequency domain and across 2 symbols along the time domain (hereinafter sub-CORESET 702'), and the CORESET 704 includes a portion of resource blocks that extend into the frequency range 708 of the PDSCH by a frequency range 710 along the frequency domain and across 1 symbol along the time domain (hereinafter sub-CORESET 704'). Based on such resource blocks configurations and respective usages of the CORESETs 702 and 704, the BS may determine that at least one of such sub-CORESETs 702' and 704' can be used by the PDSCH. In some embodiments, a field within the DCI signal 700 may indicate that respective resource blocks occupied by the sub-CORESET 702' and/or sub-CORESET 704' can be used by the BS to transmit data on the PDSCH.

In some embodiments, such a field in the DCI may be implemented by various techniques such as, for example, a bitmap. In the example of FIG. 7, a bitmap with a length of 2 bits may be used, which is determined based on a number of CORESETs in accordance with some embodiments. When only the CORESET 702 is chosen to be used by the PDSCH, the bitmap of the DCI signal 700 may indicate a value of "01;" and when only the CORESET 704 is chosen to be used by the PDSCH, the bitmap of the DCI signal 700 may indicate a value of "10," for example. More specifically, when the bitmap indicates 01, the PDSCH may be, forwardly or backwardly, extended along the time domain to cause at least part of the PDSCH to overlap the CORESET 702 so as to determine respective resource block(s) of the sub-CORESET 702'; and when the bitmap indicates 10, the PDSCH may be, forwardly or backwardly, extended along the time domain to cause at least part of the PDSCH to overlap the CORESET 704 so as to determine respective resource block(s) of the sub-CORESET 704'.

In some embodiments, a BS may assign a set of CORESETs to a UE that can be used by a respective PDSCH, as illustrated and discussed above in FIGS. 3-6. Further, respective resource blocks of each of the CORESETs may be determined based on various characteristics of the UE and/or respective characteristics of the CORESETs. In an embodiment, the BS has a system bandwidth of about 100 MHz while the UE has a relatively smaller bandwidth of about 20 MHz. As such, the BS may assign a total "M" number of CORESETs over the 100 MHz, and assign a total "N" number of CORESETs to the UE, wherein N<M, and those N CORESETs are located within a respective frequency range of the UE's 20 MHz bandwidth.

In another embodiment, the BS may assign the set of CORESETs based on a designation type of the CORESET, e.g., whether each of the set of CORESETs is a UE-specific CORESET or a common CORESET. For example, a total number of 6 CORESETs (e.g., $1^{st}$, $2^{nd}$, $3^{rd}$, $4^{th}$, $5^{th}$, and $6^{th}$) are available to be used by the UE to transmit data on a respective PDSCH, 2 of which (e.g., $1^{st}$, and $2^{nd}$) are common CORESETs and 4 of which (e.g., $3^{rd}$, $4^{th}$, $5^{th}$, and $6^{th}$) are UE-specific CORESETs. In some cases, based on a pre-defined protocol (e.g., RRC), only the UE-specific CORESETs ($3^{rd}$, $4^{th}$, $5^{th}$, and $6^{th}$) can be used by the UE. The BS may send a DCI signal containing a field of 4 bits to indicate that only the $3^{rd}$, $4^{th}$, $5^{th}$, and $6^{th}$ CORESETs can be used by the UE to transmit data on the respective PDSCH.

Yet in another embodiment, the BS may assign the set of CORESETs based on a transmission mode of the CORESET, e.g., whether each of the set of CORESETs is a localized CORESET or distributed CORESET. For example, a total number of 7 CORESETs (e.g., $1^{st}$, $2^{nd}$, $3^{rd}$, $4^{th}$, $5^{th}$, $6^{th}$, and $7^{th}$) are available to be used by the UE to transmit data on a respective PDSCH, 2 of which (e.g., $1^{st}$, and $2^{nd}$) are localized CORESETs and 5 of which (e.g., $3^{rd}$, $4^{th}$, $5^{th}$, $6^{th}$, and $7^{th}$) are distributed CORESETs. In some cases, based on a pre-defined protocol (e.g., RRC), only the localized CORESETs ($1^{st}$ and $2^{nd}$) can be used by the UE. The BS may send a DCI signal containing a field of 2 bits to indicate that only the $1^{st}$ and $2^{nd}$ CORESETs can be used by the UE to transmit data on the respective PDSCH.

In some embodiments, a BS may assign a respective set of CORESETs to each of a plurality of UEs that can be used by a respective PDSCH. For example, the BS may determine a total number of 6 CORESETs, 3 of which (e.g., $1^{st}$, $2^{nd}$, and $3^{rd}$) are assigned to a first UE to transmit PDCCH or to blindly decode PDCCH, and 3 of which (e.g., $4^{th}$, $5^{th}$, and $6^{th}$) are assigned to a second UE to transmit PDCCH or to blindly decode PDCCH. In an embodiment, respective configurations of such 6 CORESETs may be predefined through the RRC as mentioned above, so that both the first and second UE's know respective resource block configurations of these 6 CORESETs. As such, the BS may use a DCI signal containing a field of 3 bits to indicate whether three transmitting PDCCH's CORESETs can be used to transmit data on the respective PDSCH. For the first UE, the DCI signal indicates $1^{st}$, $2^{nd}$, and $3^{rd}$ CORESETs, and for the second UE, the DCI signal indicates $4^{th}$, $5^{th}$, and $6^{th}$ CORESETs. In an alternative embodiment, the BS may use a DCI signal (different form the DCI signal above) to indicate that all $1^{st}$, $2^{nd}$, $3^{rd}$, $4^{th}$, $5^{th}$, and $6^{th}$ CORESETs can be used by the first UE to transmit data on the respective PDSCH, and all $1^{st}$, $2^{nd}$, $3^{rd}$, $4^{th}$, $5^{th}$, and $6^{th}$ CORESETs can be used by the second UE to transmit data on the respective PDSCH, in this case, the DCI signal is 6 bits length. The DCI signal can be included in a UE-specific PDCCH, or a common PDCCH, or a group-common PDCCH.

Although the above-discussed system and method are directed to allocating one or more CORESETs sent on the PDCCH to be used for transmitting data on the PDSCH (i.e., downlink communication), it is noted that the disclosed system and method can also be used for uplink communication while remaining within the scope of the present disclosure. For example, a UE may assign which of respective CORESETs (or in a different term), sent on a physical uplink control channel (PUCCH), can be used to transmit data to a BS on a physical uplink shared channel (PUSCH).

While various embodiments of the invention have been described above, it should be understood that they have been presented by way of example only, and not by way of limitation. Likewise, the various diagrams may depict an example architectural or configuration, which are provided to enable persons of ordinary skill in the art to understand exemplary features and functions of the invention. Such persons would understand, however, that the invention is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device.

A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method, comprising:
    transmitting a first control signal using at least one or more communication resources via a first communication channel, wherein the first control signal indicates which of the one or more communication resources can be used for transmitting data via a second communication channel; and
    responsive to the first control signal indicating that the at least first one of the one or more communication resources can also be used for transmitting data via the second communication channel, transmitting the data using at least part of the at least first one of the one or more communication resources via the second communication channel, wherein the one or more communication resources each comprises a control resource set (CORESET), the CORESET comprising a subset of resource blocks used to transmit downlink control information (DCI) that a user equipment (UE) attempts to decode in order to retrieve information contained in the DCI, and wherein the DCI is contained within the CORESET,
    wherein the first control signal comprises:
        a first bit for indicating whether a first one of the one or more communication resources can be used for transmitting data via the second communication channel, wherein the first one of the one or more communication resources includes at least a portion of a first CORESET that overlaps the second communication channel in the time and frequency domains; and
        a second bit for indicating whether a second one of the one or more communication resources can be used for transmitting data via the second communication channel, wherein the second one of the one or more communication resources includes at least a portion of a second CORESET that overlaps the second communication channel in the time and frequency domains.

2. The method of claim 1, wherein the first communication channel comprises a physical downlink control channel, and the second communication channel comprises a physical downlink shared channel.

3. The method of claim 1, wherein the first communication channel comprises a physical uplink control channel, and the second communication channel comprises a physical uplink shared channel.

4. The method of claim 1, wherein:
    the first control signal indicates that at least one of the first one and the second one of the one or more communication resources can be used for transmitting data via the second communication channel; and wherein the method further comprises:
    in response to the first control signal indicating that at least one of the first one and the second one of the one or more communication resources can be used for transmitting data via the second communication channel, transmitting the data using at least part of at least one of the first one and the second one of the one or more communication resources, respectively, via the second communication channel.

5. The method of claim 1, further comprising:
    transmitting a second control signal using the second one of the one or more communication resources via either the first or second communication channel, wherein the second control signal indicates which portion of the at least first one of the one or more communication resources can be used for transmitting data via the second communication channel; and
    based on the first and second control signals, transmitting the data using the indicated portion of the at least first one of the one or more communication resources via the second communication channel.

6. The method of claim 1, further comprising:
determining which of the one or more communication resources can be used for transmitting the data via the second communication channel based on a respective bandwidth of a receiving node.

7. The method of claim 6, wherein the CORESET is associated with a designation type and a transmission mode, and wherein the designation type comprises whether each of the one or more communication resources is UE-specific or common, and the transmission mode comprises whether each of the one or more communication resources is localized or distributed.

8. A method, comprising:
receiving a first control signal transmitted using at least one or more communication resources via a first communication channel, wherein the first control signal indicates which of the one or more communication resources can be used for transmitting data via a second communication channel; and
receiving the data transmitted using at least part of the at least first one of the one or more communication resources via the second communication channel in response to the first control signal indicating that the at least first one of the one or more communication resources can be used for transmitting data via the second communication channel, wherein the one or more communication resources each comprises a control resource set (CORESET), the CORESET comprising a subset of resource blocks used to transmit downlink control information (DCI) that a user equipment (UE) attempts to decode in order to retrieve information contained in the DCI, and wherein the DCI is contained within the CORESET,
wherein the first control signal comprises:
a first bit for indicating whether a first one of the one or more communication resources can be used for transmitting data via the second communication channel, wherein the first one of the one or more communication resources includes at least a portion of a first CORESET that overlaps the second communication channel in the time and frequency domains; and
a second bit for indicating whether a second one of the one or more communication resources can be used for transmitting data via the second communication channel, wherein the second one of the one or more communication resources includes at least a portion of a second CORESET that overlaps the second communication channel in the time and frequency domains.

9. The method of claim 8, wherein the first communication channel comprises a physical downlink control channel, and the second communication channel comprises a physical downlink shared channel.

10. The method of claim 8, wherein the first communication channel comprises a physical uplink control channel, and the second communication channel comprises a physical uplink shared channel.

11. The method of claim 8, wherein:
the first control signal indicates that at least one of the first one and the second one of the one or more communication resources can be used for transmitting data via the second communication channel; and wherein the method further comprises:
receiving the data transmitted using at least part of at least one of the first one and the second one of the one or more communication resources, respectively, via the second communication channel in response to the first control signal indicating that at least one of the first one and the second one of the one or more communication resources can be used for transmitting data via the second communication channel.

12. A communication node, comprising:
a transmitter configured to transmit a first control signal using at least one or more communication resources via a first communication channel, wherein the first control signal indicates which of the one or more communication resources can be used for transmitting data via a second communication channel, and
in response to the first control signal indicating that the at least first one of the one or more communication resources can be used for transmitting data via the second communication channel, further configured to transmit the data using at least part of the at least first one of the one or more communication resources via the second communication channel, wherein the one or more communication resources each comprises a control resource set (CORESET), the CORESET comprising a subset of resource blocks used to transmit downlink control information (DCI) that a user equipment (UE) attempts to decode in order to retrieve information contained in the DCI, and wherein the DCI is contained within the CORESET,
wherein the first control signal comprises:
a first bit for indicating whether a first one of the one or more communication resources can be used for transmitting data via the second communication channel, wherein the first one of the one or more communication resources includes at least a portion of a first CORESET that overlaps the second communication channel in the time and frequency domains; and
a second bit for indicating whether a second one of the one or more communication resources can be used for transmitting data via the second communication channel, wherein the second one of the one or more communication resources includes at least a portion of a second CORESET that overlaps the second communication channel in the time and frequency domains.

13. The communication node of claim 12, wherein the first communication channel comprises a physical downlink control channel, and the second communication channel comprises a physical downlink shared channel.

14. The communication node of claim 12, wherein the first communication channel comprises a physical uplink control channel, and the second communication channel comprises a physical uplink shared channel.

15. The communication node of claim 12, wherein the first control signal indicates that at least one of the first one and the second one of the one or more communication resources can be used for transmitting data via the second communication channel, and the transmitter is further configured to in response to the first control signal indicating that at least one of the first one and the second one of the one or more communication resources can be used for transmitting data via the second communication channel, transmit the data using at least part of at least one of the first one and the second one of the one or more communication resources, respectively, via the second communication channel.

16. The communication node of claim 12, wherein the transmitter is further configured to transmit a second control signal using the second one of the one or more communication resources via either the first or second communication channel, wherein the second control signal indicates which portion of the at least first one of the one or more communication resources can be used for transmitting data via the second communication channel, and based on the first and second control signals, transmit the data using the indicated portion of the at least first one of the one or more communication resources via the second communication channel.

17. A communication node, comprising:
   a receiver configured to receive a first control signal transmitted using at least one or more communication resources via a first communication channel, wherein the first control signal indicates which of the one or more communication resources can be used for transmitting data via a second communication channel, and receive the data transmitted using at least part of the at least first one of the one or more communication resources via the second communication channel in response to the first control signal indicating that the at least first one of the one or more communication resources can be used for transmitting data via the second communication channel, wherein the one or more communication resources each comprises a control resource set (CORESET), the CORESET comprising a subset of resource blocks used to transmit downlink control information (DCI) that a user equipment (UE) attempts to decode in order to retrieve information contained in the DCI, and wherein the DCI is contained within the CORESET,
   wherein the first control signal comprises:
      a first bit for indicating whether a first one of the one or more communication resources can be used for transmitting data via the second communication channel, wherein the first one of the one or more communication resources includes at least a portion of a first CORESET that overlaps the second communication channel in the time and frequency domains; and
      a second bit for indicating whether a second one of the one or more communication resources can be used for transmitting data via the second communication channel, wherein the second one of the one or more communication resources includes at least a portion of a second CORESET that overlaps the second communication channel in the time and frequency domains.

18. The communication node of claim 17, wherein the first communication channel comprises a physical downlink control channel, and the second communication channel comprises a physical downlink shared channel.

19. The communication node of claim 17, wherein the first communication channel comprises a physical uplink control channel, and the second communication channel comprises a physical uplink shared channel.

20. The communication node of claim 17, wherein the first control signal indicates that at least one of the first one and the second one of the one or more communication resources can be used for transmitting data via the second communication channel, and wherein the receiver is further configured to receive the data transmitted using at least part of at least one of the first one and the second one of the one or more communication resources, respectively, via the second communication channel in response to the first control signal indicating that at least one of the first one and the second one of the one or more communication resources can be used for transmitting data via the second communication channel.

* * * * *